United States Patent
Hindi et al.

(10) Patent No.: US 11,060,208 B1
(45) Date of Patent: Jul. 13, 2021

(54) SYSTEM AND METHOD FOR MANUFACTURING SHELLAC FLOSS

(71) Applicant: KING ABDULAZIZ UNIVERSITY, Jeddah (SA)

(72) Inventors: Sherif Shawki Zaki Hindi, Jeddah (SA); Uthman Mohammed Ahmed Dawoud, Jeddah (SA); Khalid Ali Mohammed Asiry, Jeddah (SA)

(73) Assignee: KING ABDULAZIZ UNIVERSITY, Jeddah (SA)

( * ) Notice: Subject to any disclaimer, the term of this patent is extended or adjusted under 35 U.S.C. 154(b) by 0 days.

(21) Appl. No.: 17/207,856

(22) Filed: Mar. 22, 2021

(51) Int. Cl.
| | |
|---|---|
| H05B 6/68 | (2006.01) |
| D01D 5/08 | (2006.01) |
| B29C 67/00 | (2017.01) |
| C09F 1/00 | (2006.01) |
| D01D 5/084 | (2006.01) |
| H01J 25/50 | (2006.01) |
| H01J 23/38 | (2006.01) |
| H01J 23/00 | (2006.01) |
| H05B 6/70 | (2006.01) |
| H05B 6/64 | (2006.01) |
| F16F 15/067 | (2006.01) |

(52) U.S. Cl.
CPC ............ *D01D 5/084* (2013.01); *H01J 23/005* (2013.01); *H01J 23/38* (2013.01); *H01J 25/50* (2013.01); *H05B 6/642* (2013.01); *H05B 6/681* (2013.01); *H05B 6/707* (2013.01); *F16F 15/067* (2013.01); *H05B 2214/03* (2013.01)

(58) Field of Classification Search
CPC ........ D01D 5/084; H01J 23/005; H01J 23/38; H01J 25/50; H05B 6/642; H05B 6/68; H05B 6/707
USPC ....... 219/770, 775, 679, 762, 701, 710, 759, 219/750, 681, 746; 264/470, 420, 490, 264/432, 489, 402, 495, 146, 75, 515, 264/464, 472, 474, 475, 576, 234; 424/52, 451, 481
See application file for complete search history.

(56) References Cited

U.S. PATENT DOCUMENTS

| | | | |
|---|---|---|---|
| 6,767,498 B1 * | 7/2004 | Talley, Jr. ................ | D01F 8/04 264/103 |
| 8,506,873 B2 * | 8/2013 | Graeber .................. | B29C 70/30 264/490 |
| 2014/0065079 A1 * | 3/2014 | To .......................... | A61Q 11/00 424/52 |

* cited by examiner

*Primary Examiner* — Quang T Van
(74) *Attorney, Agent, or Firm* — W&C IP (57) ABSTRACT

A system for manufacturing purified shellac floss from crude shellac includes a spinner unit, and a rotatable head with a cavity to accommodate the crude shellac. A microwave generator unit is configured to supply microwave radiation to the spinner unit. A collection unit has a side wall and an end wall defining an interior volume and is configured to collect the purified shellac floss.

20 Claims, 7 Drawing Sheets

SYSTEM AND METHOD FOR MANUFACTURING SHELLAC FLOSS

TECHNICAL FIELD

The present disclosure relates to manufacturing of shellac floss. More specifically, the present disclosure relates to a system and a method for manufacturing shellac floss intact with natural qualities.

BACKGROUND

Shellac or lac is a polymeric resin secreted by the female of shellac insect *Laccifer lacca* belonging to the family of Kerridae (superfamily: Coccidae, order: Hemiptera). The shellac insects are hosted by certain species of Leguminosae and Moraceae plant families of eastern Asia forests in India and Thailand. The shellac insect is a pestilent insect habituated in many warmer climates, however, majority of propagation and harvesting for economic gain occurs mainly in the forested areas of India. The identifiable feature of the Hemipteran order of insects is their mouthparts, the proboscis which can pierce plant tissue, and suck out the plant's sap. As the immature nymphs suck the tree's sap, they immediately exude a mixture of resin and wax through their bodies, forming a protective cell reminiscent of a cocoon. Shellac production involves pruning, inoculation, phunki removal, harvesting and shellac scraping. Farmers perform these operations manually using traditional equipment. Shellac finds applications in diverse industries such as food, pharmaceuticals, building and construction, and leather and manufacturing industries.

Due to manual scraping from the plant, various visible and invisible impurities get trapped into raw shellac. Bark shavings, insects, moisture, pollens, dust and pollutants are some of the common impurities found in raw shellac. Traditionally, the impurities are removed by first washing and then drying the raw shellac resulting in a form called seedlac. The treated shellac is then purified into a semi-refined shellac form by hot filtration. The shellac resin can be produced either as membrane, flakes, buttons, wax, or refined products including waxed, dewaxed, bleached and decolored liquids. However, among many disadvantages of processing the shellac according to current methods is that the methods are tedious and require lot of energy and time. Another disadvantage is the difficulty in ensuring the removal of all the possible contaminations present in the shellac. This is mainly due to the fact that the impurities present in the raw shellac are diverse and difficult to manage by a single method. Even when the impurities are removed, the current procedures fail to ensure the quality and characteristics of the natural shellac. Considering the diverse applications and industrial advantages of shellac, there is a dire need to provide a simple and efficient method of shellac manufacture. The method should also ensure the natural qualities and advantages for which shellac is known for remain intact.

SUMMARY

The present disclosure relates to a system for manufacturing purified shellac floss from crude shellac. The disclosure also relates to a method of manufacturing purified shellac floss from crude shellac and also a method of using the manufactured purified shellac floss.

In one aspect, the present disclosure includes the system for manufacturing purified shellac floss from crude shellac. The system includes a spinner unit, a microwave generator unit and a collection unit. The spinner unit comprises of a rotatable head with a cavity to accommodate the crude shellac. The microwave generator unit is configured to supply microwave radiation to the spinner unit. The collection unit includes a side wall and an end wall defining an interior volume and configured to collect the purified shellac floss. In certain embodiments, at least a portion of the side wall of the collection unit includes perforations. In some embodiments, the collection unit is made of a metal or a plastic material. In a preferred embodiment, the collection unit is made of stainless steel.

In some examples, the rotatable head is hemispherical in shape. In various embodiments, the rotatable head of the spinner unit is configured to rotate at a speed between 2000 to 4000 rpm. In some embodiments of the present disclosure, the spinner unit further includes a motor, a coil support attached with the motor and configured to control vibrations during operation and a first connector connecting the motor to the rotatable head. In certain embodiments, the microwave generator unit further includes a magnetron, a transformer configured to supply electric power to the magnetron and a capacitor in communication with the magnetron and the transformer. According to some embodiments of the present disclosure, the system further includes the microwave generator unit with a rheostat configured to communicate with the transformer and a second connector configured to communicate between the rheostat and an electric source. In some embodiments, the microwave generator unit also includes a waveguide arranged to direct the microwaves from the magnetron towards the spinner unit and a fan configured to distribute air around the transformer and the magnetron.

In another aspect, the present disclosure relates to the method of manufacturing the purified shellac floss. The method includes micronizing the crude shellac flakes and introducing into a spinner unit. The method further includes supplying microwave radiation to the spinner unit and melting the micronized shellac flakes with the microwave radiation at a predetermined temperature. The melting is followed by centrifuging the melted micronized flakes at a predetermined speed to form the purified shellac floss and collecting the purified shellac floss in a collection unit.

In some embodiments, the method further includes melting the micronized shellac flakes at the predetermined temperature where the temperature is maintained between 60° C. to 85° C. In certain embodiments, the predetermined temperature is about 75° C. In other embodiments, the method further includes micronizing the crude shellac flakes having a shape including rectangular, circular, square, oval, elliptical, triangular, polygonal, hexagonal, octagonal, acicular, or a combination of different shapes into needle-shaped shellac flakes. According to some embodiments, the crude shellac flakes are micronized to a size less than or equal to about 0.20-0.25 µm×3-5 cm. In few examples, the crude shellac flakes are micronized with the size equal to about 0.25 µm×5 cm. In some embodiments of the present disclosure, the method further includes centrifuging the spinner unit at the predetermined speed between 2000 to 4000 rpm. In certain embodiments, the predetermined speed of the spinner unit is 2300 rpm. In yet other embodiments, the predetermined speed of the spinner unit is 3600 rpm. The present disclosure also includes the method of using the purified shellac floss in preparation of products including electronic goods, pharmaceuticals, drug delivery material, agricultural appliances, food products, building material, insulation material and membranes.

The foregoing as well as other features and advantages of the present disclosure will be more fully understood from the following description, examples, and claims.

BRIEF DESCRIPTION OF THE DRAWINGS

The drawings described below are for illustration purposes only and are not intended to limit the scope of the present disclosure in any way.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements. A skilled artisan will appreciate that various alternate embodiments and forms may be prepared. Examples, therefore, given are only for illustration purposes without any intention to restrict the embodiments to a given set of examples. Specific functional aspects are provided merely to enable a person skilled in the art to perform the invention and should not be construed as limitations of the invention. Any method steps, and processes described herein are not to be construed as necessarily requiring their performance in the particular order discussed or illustrated, unless specifically identified as an order of performance. It is also to be understood that additional or alternative steps may be employed, unless otherwise indicated.

The present disclosure relates to a system for manufacturing purified shellac floss from crude shellac. The system includes a spinner unit having a rotatable head with a cavity to accommodate the crude shellac. The system includes a microwave generator unit configured to supply microwave radiation to the spinner unit. The system further includes a collection unit comprising a side wall and an end wall defining an interior volume. The collection unit is configured to collect the purified shellac floss.

The present disclosure also includes a method of manufacturing the purified shellac floss by micronizing crude shellac flakes and introducing into the spinner unit. The method includes supplying microwave radiation to the spinner unit and melting the micronized shellac flakes with the microwave radiation at a predetermined temperature. The melted micronized flakes are subjected to centrifugation at a predetermined speed to form purified shellac floss and the purified shellac floss is collected in the collection unit.

As used herein, "crude shellac flakes" or "flakes" or "shellac" or "lac" refers to any resin secreted by an insect that can be processed for industrial applications, such as electric, agriculture, food and construction industries.

As used herein, "microwave" or "microwave radiation" refers to the portion of electromagnetic spectrum with wavelengths between 1 mm and 1 m (or the equivalent frequency range from 300 GHz to 300 MHz) irrespective of the source of the microwaves.

As used herein, "micronization" or "micronize" or "micronizing" refers to any method or technique suitable to reduce the size or average diameter of shellac flakes including traditional techniques such as grinding, milling, or modern techniques such as RESS (Rapid Expansion of Supercritical Solutions), SAS method (Supercritical Anti-Solvent), PGSS method (Particles from Gas Saturated Solutions), or any other method or technique.

As used herein, "collection unit" or "collection bowl" or "bowl" includes any container or device attached to the spinner unit, or provided separately, to collect the floss coming out of the rotatable head or centrifuge. The terms are synonymously used throughout the disclosure unless otherwise explicitly mentioned.

As used herein, "system" "apparatus" or "device" or "thermospinner" or "microwave-assisted thermospinner" or "microwave thermospinner" are used synonymously unless otherwise explicitly mentioned.

As used herein, "amount" refers to the level or concentration of one or more elements or end-products of the system and the methods of the present disclosure.

The use of the singular herein includes the plural (and vice versa) unless specifically stated otherwise.

The use of the terms "include," "includes", "including," "have," "has," or "having," "comprise," "comprises," "comprising" or the like should be generally understood as open-ended and non-limiting unless specifically stated otherwise.

It is understood that the order of steps or order for performing certain actions can be changed so long as the intended result is obtained. Moreover, two or more steps or actions may be conducted simultaneously.

As used herein, the term "about" or "between" refers to a ±20% to ±10% variation from the nominal value unless otherwise indicated.

Figure 1:
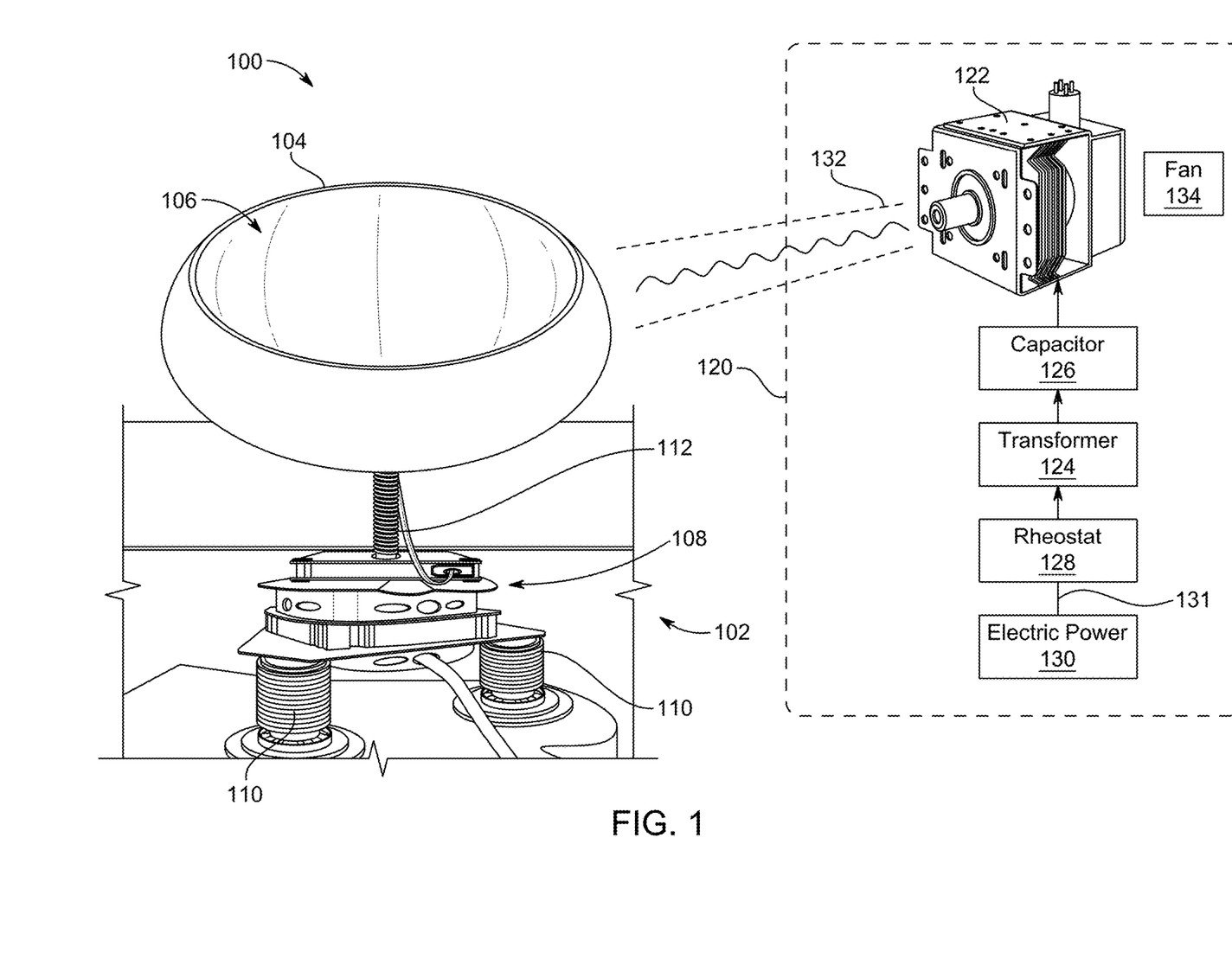
FIG. 1 shows a front perspective view of a system having a microwave generator unit and a spinner unit, according to an embodiment of the present disclosure.

FIG. 1 illustrates a system 100 for manufacturing the purified shellac floss from the crude shellac, according to an embodiment of the present disclosure. The system 100 includes a spinner unit 102 having a rotatable head 104. The rotatable head 104 includes a spinner head disposed with an outer bowl and defines a cavity 106 to accommodate the crude shellac. In some embodiments, the spinner unit 102 further includes a motor 108 and a coil support 110 attached with the motor 108. In some embodiments, the coil support 110 may be disposed between the motor 108 and a platform on which the motor 108 is mounted. The coil support 110 is configured to control vibrations of the rotatable head 104 during operation of the spinner unit 102. In some embodiments, the spinner unit 102 is configured to rotate at a speed between 2000 to 4000 rpm. The spinner unit 102 also includes a first connector 112 configured to connect the motor 108 to the rotatable head 104. In some embodiments, the system 100 may include a plurality of coil supports 110 for the motor 108 to provide stability during operation. In one embodiment, at least three coil supports 110 may be connected to the motor 108. In some embodiments, the rotatable head 104 of the spinner unit 102 may be hemispherical in shape. In some embodiments, the spinner unit 102 comprises the rotatable head 104. The rotatable head includes a spinner head disposed within an outer bowl. The outer bowl defining a head cavity.

The system 100 further includes a microwave generator unit 120 configured to supply microwave radiation to the spinner unit 102. The microwave generator unit 120 includes a magnetron 122 for converting high-voltage electric power to microwave radiations, a transformer 124 configured to supply the high-voltage electric power to the magnetron 122, and a capacitor 126 connected to the magnetron 122 to provide steady current flows from the transformer 124 to the magnetron 122. In some embodiments, the magnetron 122 may be a cavity magnetron that works as a self-excited microwave oscillator converting the high-voltage electric power to the microwave radiations. In some embodiments, the transformer 124 may be a high-voltage power source transformer which passes electric energy to the magnetron 122. In some embodiments, the capacitor 126 is disposed between the magnetron 122 and the transformer 124. In some embodiments, the microwave generator unit 120 may include a diode (not shown) to provide unidirectional flow of the electric power supply by converting alternate current to direct current. In some embodiments of the present disclosure, the microwave generator unit 120 includes a rheostat 128 in electric communication with the transformer 124. The rheostat 128 is configured to regulate electric power supply received from an electric power source 130. The microwave generator unit 120 includes a second connector configured to connect the rheostat 128 and the electric power source 130. In some embodiments, the microwave generator unit 120 further includes a waveguide 132 configured to direct the microwave radiations from the magnetron 122 towards the spinner unit 102 and a fan 134 configured to distribute air around the transformer 124 and the magnetron 122. The waveguide 132 may be a conduit or a pipe through which the microwave radiations are directed towards the rotatable head 104. In some embodiments, the waveguide 132 may be a short metallic waveguide coupled to the magnetron 122 to direct microwave radiations towards the rotatable head 104. In some embodiments, the microwave radiations from the magnetron 122 may travel in the air through a pipe and distributed into a cavity of the pipe by conduction. In some embodiments, the pipe may be made of stainless steel having an internal diameter less than or equal to 5 inches. In one embodiment, the internal diameter of the pipe is equal to 1 inch. The microwave radiations travel to the outer side of the rotatable head 104 are tuned at a predetermined temperature that is adequate to melt the shellac flakes. In some embodiments, the capacitor 126 is connected to an outlet of the waveguide 132 via the diode.

Figure 2:
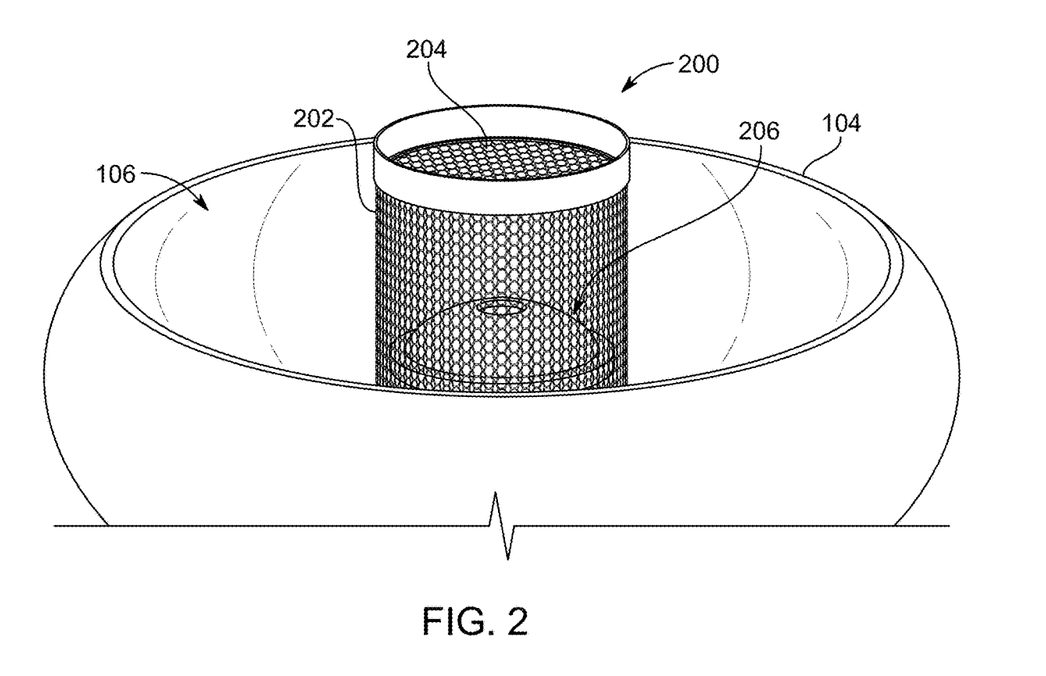
FIG. 2 shows a schematic top perspective view of the spinner unit and a collection unit to collect the purified shellac floss, according to an embodiment of the present disclosure.

FIG. 2 shows a schematic top perspective view of the spinner unit 102 and a collection unit 200 to collect the purified shellac floss, according to an embodiment of the present disclosure. The collection unit 200 includes a side wall 202 and an end wall 204 together configured to define an interior volume 206. The collection unit 200 is configured to collect the purified shellac floss. The collection unit 200 is a stainless steel mesh bowl that can be disposed/placed over the rotatable head 104 and within the outer bowl of the spinner unit 102. During operation, the purified shellac is collected along the side wall, and within the interior volume of the collection unit 200. The rotatable head 104 of the spinner unit 102 includes the cavity 106 to be filled by shellac flakes. Particularly, the collection unit 200 is configured to collect the pure shellac floss coming out due to centrifugation of the rotatable head 104. The side wall 202 and the end wall 204 of the collection unit 200 is designed in such a way that the shellac floss coming out of the rotatable head 104 gets trapped inside the collection unit 200. In some embodiments, at least a portion of the side wall 202 of the collection unit 200 includes perforations. In some embodiments, the end wall 204 of the collection unit 200 includes perforations. The perforations of the side wall 202 and the end wall 204 may allow escape of air and gases produced due to combustion of impurities. The collection unit 200 of the present system can be made of various materials. In some embodiments, the collection unit 200 is made of a metal or a plastic material. In an embodiment, the collection unit 200 is made of stainless steel.

In some embodiments, the collection unit 200 may be a container that can be separately mounted to the rotatable head 104 to collect the floss coming out of the rotatable head 104. As such, the collection unit 200 can be removed from the rotatable head 104 and the pure shellac floss can be separately collected. In some embodiments, the collection unit 200 may be a container of any shape that can collect the floss from the spinner unit 102. In some embodiments, the rotatable head 104 may have 20 to 80 cm outer diameter and 10 to 60 cm height. In some embodiments, the rotatable head 104 may have 38 cm outer diameter and 25 cm height. In some embodiments, the collection unit 200 is a stainless steel mesh bowl that can be disposed/placed over the rotatable head 104 and within the outer bowl of the spinner unit 102 to contain the shellac floss produced during the operation of the system 100.

Figure 3:
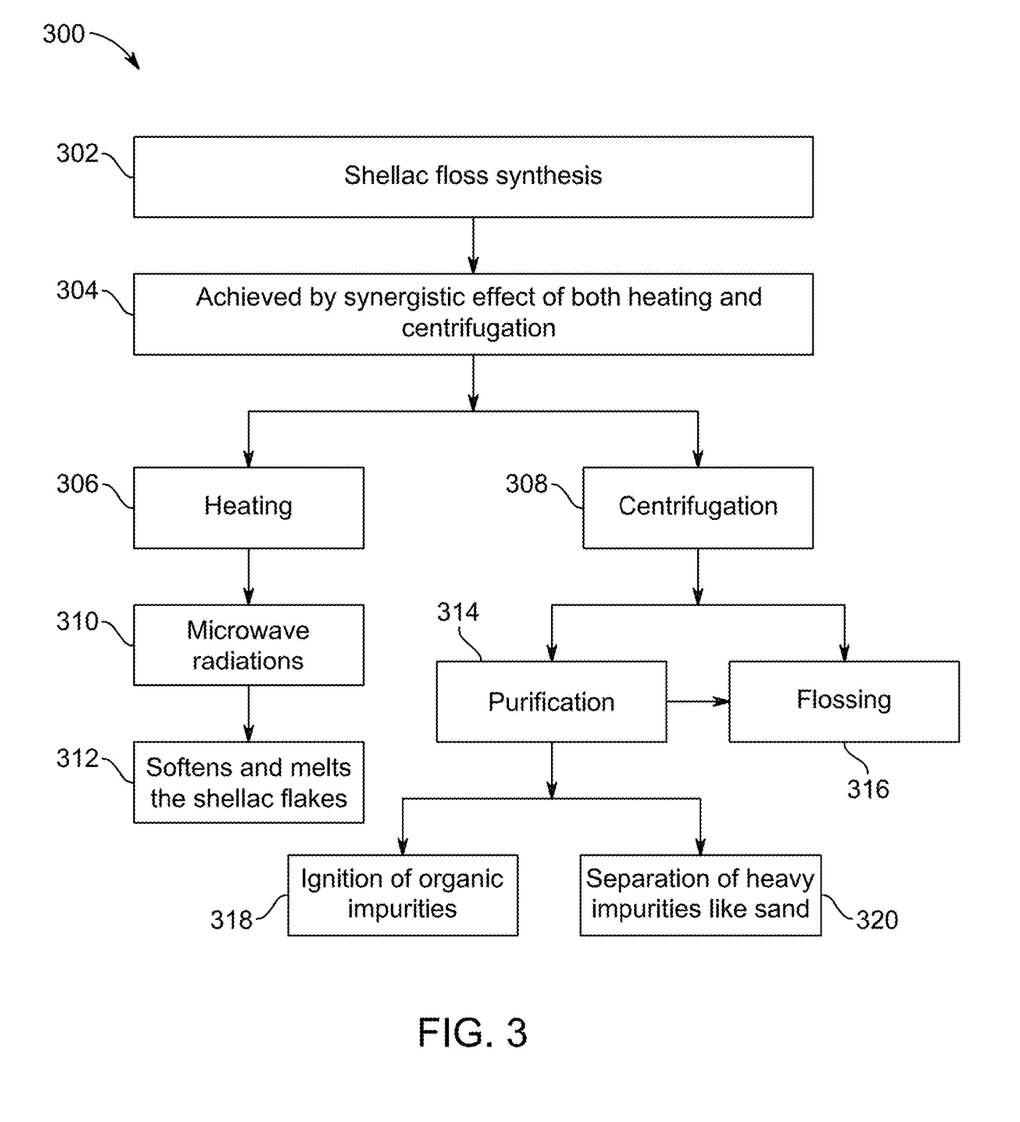
FIG. 3 shows a schematic flow diagram of a method of manufacturing purified shellac floss, according to one embodiment of the present disclosure.

FIG. 3 is a schematic flow diagram of a method 300 of manufacturing the pure shellac floss, according to an embodiment of the present disclosure. At step 302, the method 300 includes synthesis of the pure shellac floss from the crude shellac flakes by melting the crude shellac flakes and then removing the impurities before achieving the flossing. The method 300 further includes micronizing the crude shellac flakes and introducing the micronized flakes into the spinner unit 102. At step 304, synergetic effect of both centrifugation and heating on the shellac flakes is applied. At step 306, heating of the spinner unit 102 is achieved by microwave radiations. At step 310, the microwave radiation from the microwave generator unit 120 is applied to the rotatable head 104 which raise the temperature of the spinner unit 102 to the predetermined temperature. At step 314, the application of microwave radiation results in softening and subsequent melting of the shellac flakes. At step 308, the method 300 further includes centrifugation of the melted micronized flakes at a predetermined speed. The centrifugation leads to two effects on the shellac flakes, purification and flossing of the shellac flakes. At step 316, the method 300 includes the purification of the shellac flakes from organic and heavy impurities. At step 320, ignition of the organic impurities occurs due to the heat treatment. At step 322, the separation of heavy impurities such as sand from the shellac flakes occurs. At step 318, the flossing of the heat treated, and centrifuged melted shellac flakes occurs which result in the pure shellac floss.

To convert the crude shellac flakes into the purified shellac floss, maintaining and regulating the temperature of the system 100 is employed. Thus, the temperature of the system 100 is regulated in such a manner to melt the shellac flakes according to the predetermined temperature and also allow the melting shellac flakes to get centrifuged at the predefined speed such that the pure shellac floss preparation occurs uninterruptedly using the system 100. In various embodiments, the method 300 further includes melting the micronized shellac flakes at the predetermined temperature between 60° C. to 85° C. In one embodiment, the predetermined temperature is about 75° C. In some embodiments, the crude shellac flakes having a shape such as rectangular, circular, square, oval, elliptical, triangular, polygonal, hexagonal, octagonal, acicular, or a combination thereof may be micronized into needle-shaped shellac flakes. In certain embodiments, the crude shellac flakes are micronized to a size less than or equal to about 0.20-0.25 µm×3-5 cm. In specific examples, the crude shellac flakes are micronized to a size equal to about 0.25 µm×5 cm. Due to the synergetic effect of the centrifugal forces generated by the rotation of the rotatable head 104 and heat generated by the supply of the microwave radiations from the microwave generator unit 120, melting shellac flakes occurs which get converted into the purified shellac floss. To provide such synergetic effect, the speed at which the spinner unit 102 rotates is appropriately regulated. In some embodiments, the method 300 further includes centrifuging the spinner unit 102 at the predetermined speed between 2000 to 4000 rpm. Depending upon the amount of shellac flakes introduced into the cavity 106 of the rotatable head 104, the speed of the spinner unit 102 and the heat applied to the spinner unit 102 may be regulated. In some embodiments, the system 100 can be of a small-scale to produce the purified floss or of a large-scale for commercial purposes. The capacity of the system 100 will depend upon the end-use and purpose of the system 100. In some embodiments, the spinner unit 102 includes a high-speed rotatable head 104 as part of a large scale microwaved-thermospinner device or system 100 used for production of the purified shellac floss. In certain embodiments, the system of the present disclosure is a small scale microwaved-thermospinner device rotating relatively at a lesser speed for production of the purified shellac floss 302. Depending upon the capacity and end-use, the speed of the spinner unit 102 can be adjusted. In one embodiment, the predetermined speed of the spinner unit 102 is 2300 rpm. In another embodiment, the predetermined speed of the spinner unit 102 is 3600 rpm. In some embodiments, the purified shellac floss can be converted into a paste or semi-liquid or mixed with other ingredients for various industrial applications.

In some embodiments, the system 100 may include a spindle driven by the motor 108 to rotate about a vertical axis. The system 100 also includes a bowl or spinner coupled to the spindle for rotation. The motor 108 is also coupled to the rotatable head 104 to drive the rotatable head 104 about the vertical axis. In a preferred arrangement, the rotatable head 104 and the spindle may be rotated at different speeds with respect to one another. In certain embodiments, the spindle may include a microwave generation unit heating the rotatable head 104 while the rotatable head is rotated by the motor 108.

Figure 4:
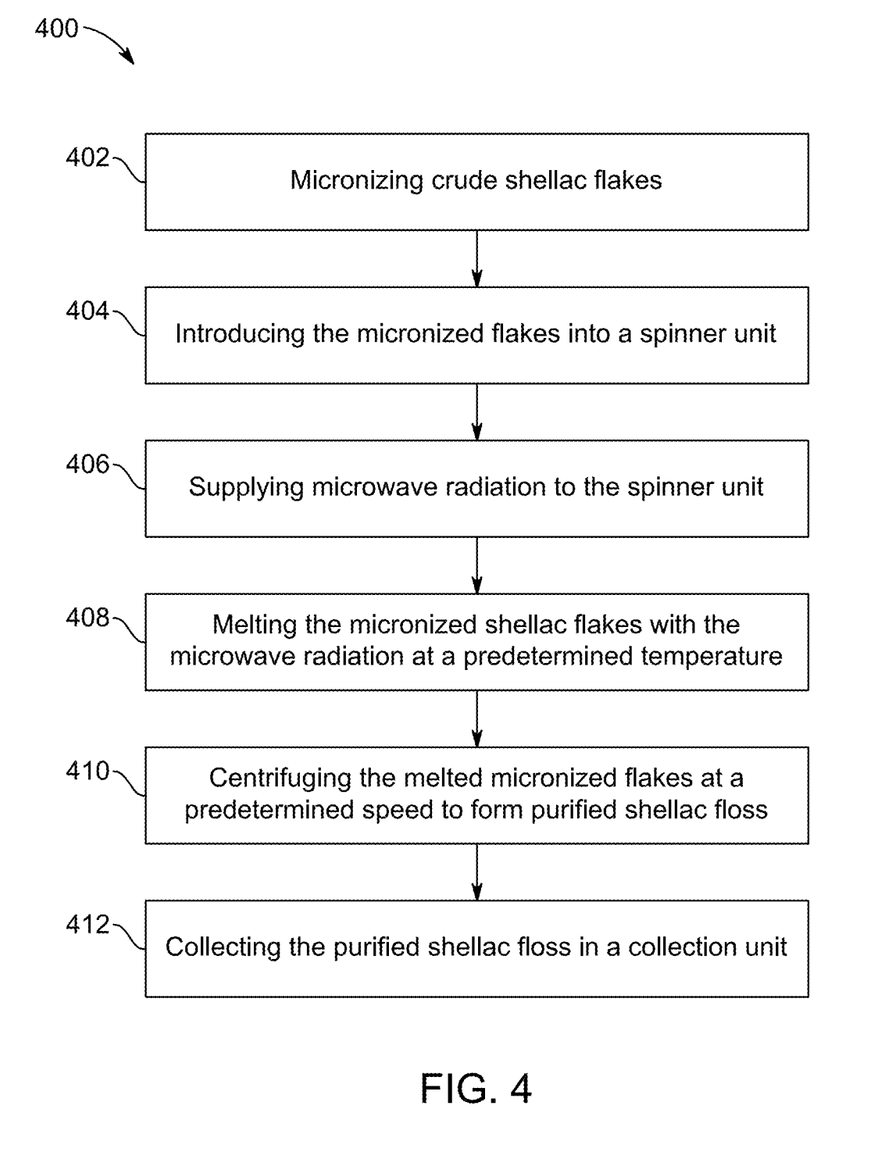
FIG. 4 shows a flow diagram of a method of manufacturing purified shellac floss, according to another embodiment of the present disclosure.

FIG. 4 illustrates a method 400 of manufacturing purified shellac floss, according to an embodiment of the present disclosure. At step 402, the method includes micronizing crude shellac flakes. At step, 404, the micronized shellac flakes are introduced into a spinner unit. At step 406, the method includes supplying microwave radiations to the spinner unit containing the micronized shellac flakes. At step 408, melting of the micronized shellac flakes with microwave radiations occurs at a predetermined temperature. At step 410, centrifuging of the melted micronized flakes take places at a predetermined speed to form purified shellac floss. At step 412, the purified shellac floss is collected in a collection unit.

According to a preferred embodiment of the method 400, the method 400 includes supplying electric power to the magnetron 122 in the microwave generator unit 120 to generate the microwave radiations. The microwave radiations supply is preferably adjusted to increase the temperature of the spinner unit 102 to a predetermined temperature. A quantity of the micronized shellac flakes is introduced into the rotatable head 104 of the spinner unit 102. After depositing, the microwave radiations cause heating and melt the deposited micronized shellac flakes in the rotatable head 104 of the spinner unit 102. The rotatable head 104 rotated at a suitable speed in the region of approximately 2000 to 4000 rpm applies centrifugal forces on the melting shellac flakes. This combined synergetic effect of the microwave radiations from the microwave generation unit 120 with the spinning of the rotatable head 104 causes the melted crude shellac flakes to turn into floss which then gathers in the collection unit 200. In an embodiment, the synergetic effect of the heat and centrifugal forces converts the melting shellac flakes into the pure shellac floss and automatically makes the floss deposition in the collection unit 200. In a specific embodiment, at least a portion of the collection unit 200 is perforated to let any impurities or gases to pass.

In various embodiments, the synergetic effect of centrifugal forces and heat removes various impurities associated with the crude shellac flakes. The high temperature and heat remove any impurities that are combusted into gases or charred into charcoal particles which get separated away by centrifugation 308 from the shellac. The purified shellac floss can be cast into different shapes and sizes. The purified shellac floss can be dissolved for various applications while maintaining the natural purity and characteristics.

While most of the known methods require utilizing complex operation and are lengthy and time consuming, the system 100 and methods of the present disclosure are advantageous in providing the purified shellac floss in one device in a single step synthesis.

The present disclosure further relates to a method of using the purified shellac floss in preparation of products including electronic goods, pharmaceuticals, drug delivery material, agricultural appliances, food products, building material, insulation material and membranes. In various embodiments, the method includes using the purified shellac floss to prepare tablet coating for delayed drug release which alleviates gastrointestinal problems. In other examples, the method includes using the purified shellac floss to make insulators for wires in electronic units, and glass incandescent bulbs. Additionally, the method includes using the purified shellac floss to enhance printing inks properties and preparing china inks. In food industry, the purified shellac of the present disclosure can be used for coating purposes to increase the shelf life of fruits and vegetables. The purified shellac can also be used as parting and glazing agent for confectionary and chocolates. Furthermore, the purified shellac can be used in cosmetics as a binder for mascara, shampoo, film former for hairspray, and micro-encapsulation of fragrances. The method of use according to the present disclosure also includes using the purified shellac floss for several agricultural uses, especially for seed coatings and leather finishes. In abrasives manufacturing, the purified shellac is suitable as a binder for grinding wheels.

EXAMPLES AND EXPERIMENTALS

Figure 5A:
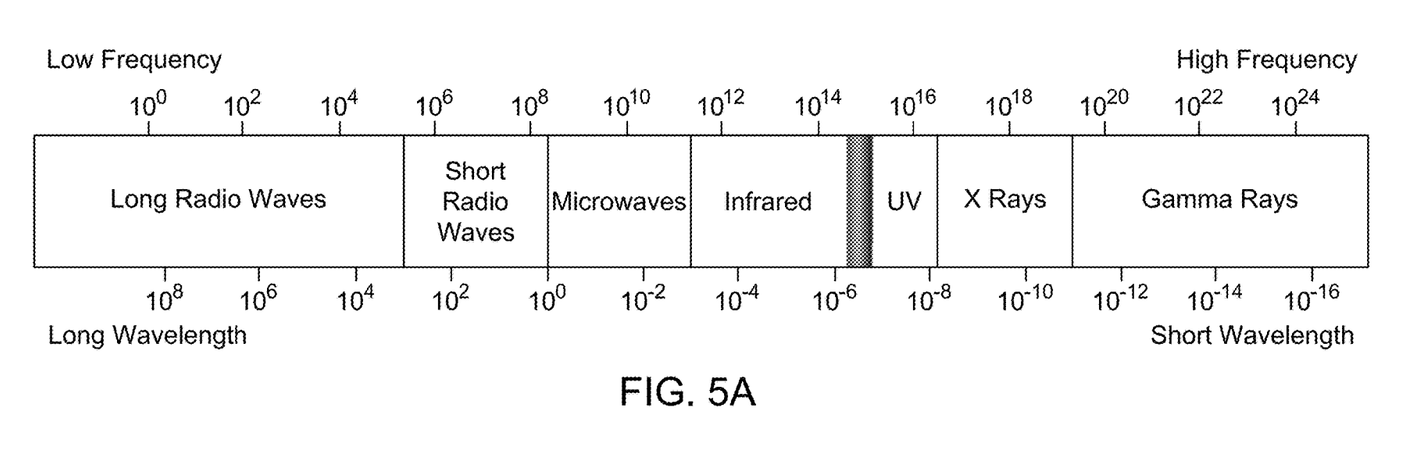
FIG. 5A illustrates a visual representation of electromagnetic spectrum.
Figure 5B:
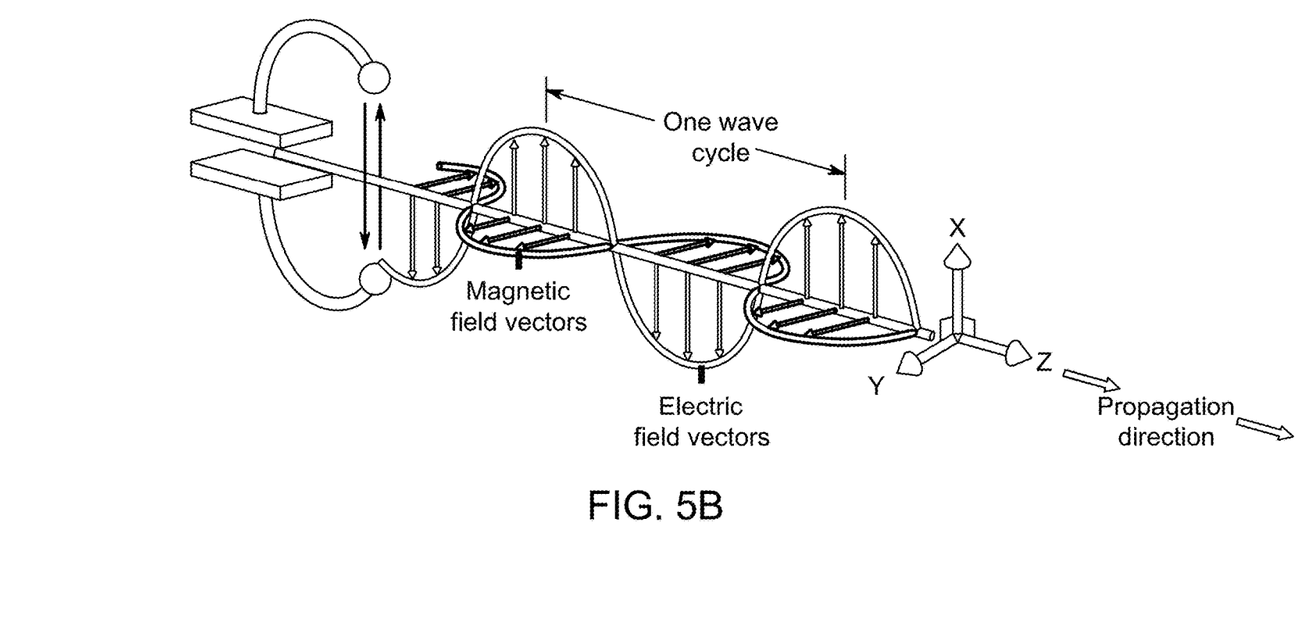
FIG. 5B illustrates a sinusoidal wave showing magnetic and electric field vectors.
Figure 5C:
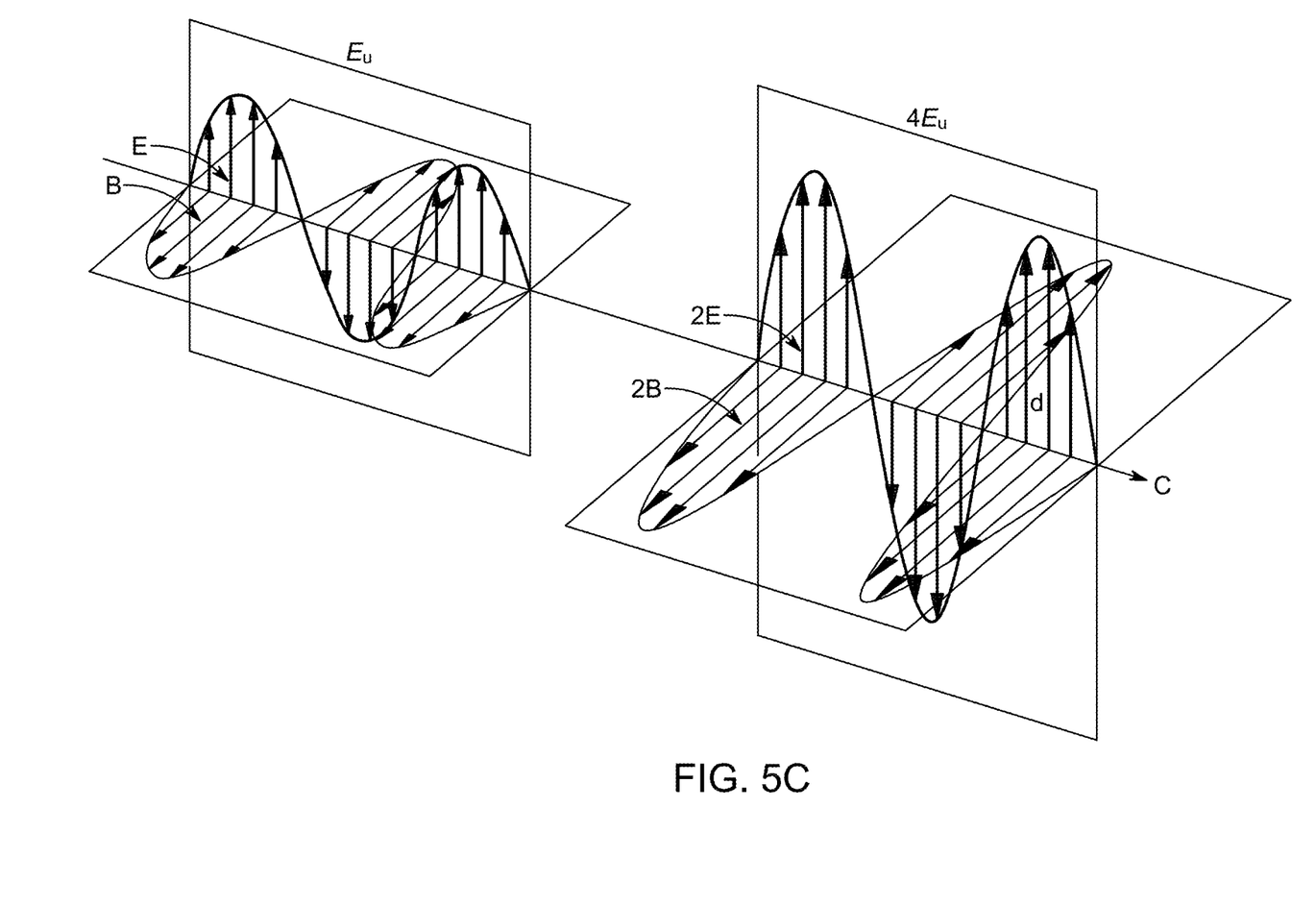
FIG. 5C illustrates proportionality between square amplitude and energy carried by the sinusoidal wave.

Referring to FIG. 5A, the microwave radiations are a form of electromagnetic waves with wavelengths ranging from about one meter to one millimeter and frequencies between 300 MHz (1 m) and 300 GHz (1 mm). The behavior of electromagnetic waves exhibits wave characteristics. But at high frequencies, electromagnetic waves also exhibit particle characteristics. The particle characteristics explain more of the properties of the electromagnetic spectra. A microwave oven works by passing microwave beams, usually at a frequency of 2.46 GHz (a wavelength of 12.24 cm), through the food. Water, fat, and sugar molecules in the food absorb energy from the microwave radiations in a process called dielectric heating. Many molecules (such as those of water) are electric dipoles exhibiting a positive charge at one end and a negative charge at the other, and therefore rotate as the molecules align with the alternating electric field induced by the microwave radiations. This molecular movement creates heat as the rotating molecules hit other molecules and put them into a motion. Microwave heating is most efficient on liquid water, and much less so on fats and sugars (which have less molecular dipole moment), and frozen water (where the molecules are not free to rotate). The electromagnetic waves can bring energy into the system 100 by virtue of their electric and magnetic fields (FIG. 5B). These fields can exert forces and move charges in the system 100 and do work on them. If the frequency of the electromagnetic wave is the same as the natural frequencies of the system 100 (such as microwaves at the resonant frequency of water molecules), the transfer of energy is much more efficient. FIG. 5C also shows that energy carried by a wave is proportional to its amplitude squared. With electromagnetic waves, larger electric and magnetic-fields exert larger forces and do more work.

Figure 5D:
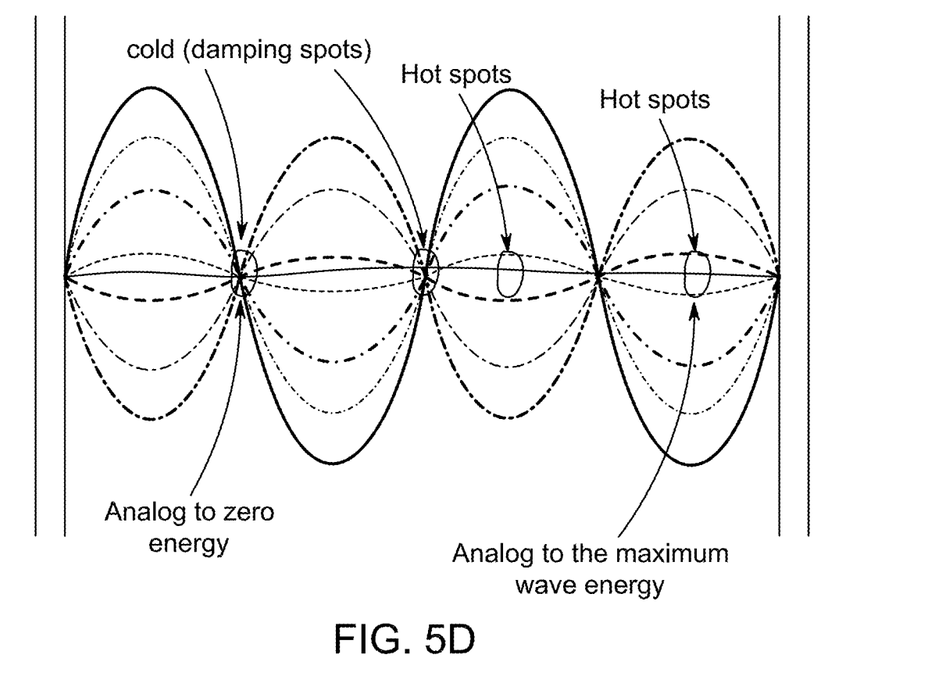
FIG. 5D shows hot and cold spots associated with microwave radiations.

Referring to FIG. 5D, additionally, one limitation of using the microwave radiations to heat the spinner unit 102 is that microwaves have hot and cold spots. This phenomenon can be practically detected by facing the microwave radiations with damp thermal paper. Exploring the propagation line (the base line) of the microwave sinusoidal curve, it can be noticed that cold (damping) spots are analogous to the intersection points of both curves of magnetic and electric waves. One advantage of the present disclosure is that this defect is eliminated since the spinner unit 101 is rotated, whereby the damping spots are alternated continuously.

Characterization of the Shellac Floss

Different physical and chemical properties of the purified shellac floss were performed to study the effects of the system 100 of the present disclosure on the shellac quality and the results are shown in Table 1. The table shows that all the purified shellac floss properties lie within the standard limits reported by other researchers [Anonymous, *Shellac specification*. Bureau of Indian Standards, New Delhi 2008; (IS 16, Part 1. 4th Revision)]; [Sharma, S. K., et al, *Shellac-Structure, Characteristics and Modification*. Def Sci J., 1983(33(3): 261-271)]; [Sharma, K. K. *Lac crop harvesting and processing*. Springer Nature Singapore Pte Ltd, 2017 (181-196)]. Thus, the color index of the shellac floss was found to be 13.2%, whereby it lies within the standard limits (8% to 50%) indicated by [Sharma, K. K. *Lac crop harvesting and processing*. Springer Nature Singapore Pte Ltd, 2017(181-196)]. The insolubility in hot alcohol of the floss (1.1%) was also within the range of 0.75%-3% as reported by the [Anonymous, *Shellac specification*. Bureau of Indian Standards, New Delhi 2008; (IS 16, Part 1. 4th Revision)]. In addition, the cold-water solubility of shellac floss was calculated and was about 0.38%, which is in accordance to the standard limits (<0.5%) as referred by [Anonymous, *Shellac specification*. Bureau of Indian Standards, New Delhi 2008; (IS 16, Part 1. 4th Revision)]. Furthermore, the volatile matter content of the floss was found to be 1.92% that adapted to the suggested range (<2%) [Anonymous, *Shellac specification*. Bureau of Indian Standards, New Delhi 2008; (IS 16, Part 1. 4th Revision)]. Also, the shellac floss had an ash content (0.286%) and is accepted according to the standard limits (<0.3%) of [Anonymous, *Shellac specification*. Bureau of Indian Standards, New Delhi 2008; (IS 16, Part 1. 4th Revision)]. In addition to the above-mentioned findings, the waxiness content was about 2.6% and is comparable to those indicated by other researchers [Anonymous, *Shellac specification*. Bureau of Indian Standards, New Delhi 2008; (IS 16, Part 1. 4th Revision)]; [Sharma, K. K. *Lac crop harvesting and processing*. Springer Nature Singapore Pte Ltd, 2017(181-196)] reporting standard limits of 2.5-5.5% and 3%-5%, respectively. For the acid value determined for the shellac floss (68 mg KOH/g), [Sharma, S. K., et al, *Shellac-Structure, Characteristics and Modification*. Def Sci J., 1983(33(3): 261-271)] have reported that this property must present at a 65-5 mg KOH/g range. Furthermore, the flow of shellac molten (54 mm) was in the range (35 to 55 mm) referred by [Sharma, K. K. *Lac crop harvesting and processing*. Springer Nature Singapore Pte Ltd, 2017(181-196)]. The heat of polymerization as an important property to characterize the purified shellac floss was found to be 34.7 min. The resulted value is in consonance with the range (30-50 min) [Sharma, K. K. *Lac crop harvesting and processing*. Springer Nature Singapore Pte Ltd, 2017(181-196)]. The specific gravity of the floss was 1.182 that agrees with the range (1.14 to 1.21) reported by both [Sharma, S. K., et al, *Shellac-Structure, Characteristics and Modification*. Def Sci J., 1983(33(3): 261-271)] and [Anonymous, *Shellac specification*. Bureau of Indian Standards, New Delhi 2008; (IS 16, Part 1. 4th Revision)]. The molecular weight of the shellac floss (1002 Daltons) is within the ranges (1006 Daltons and 660 to 1000 Daltons) obtained by [Sharma, S. K., et al, *Shellac-Structure, Characteristics and Modification*. Def Sci J., 1983(33 (3): 261-271)] and [Sharma, K. K. *Lac crop harvesting and processing*. Springer Nature Singapore Pte Ltd, 2017(181-196)], respectively.

All the data resulted from testing the shellac floss indicated that there were no changes in the purified shellac floss properties examined. These finding confirmed that the microwaved thermospinner system 100 of the present disclosure preserves the shellac quality and, subsequently endorses the suitability of the system 100 for such applications.

TABLE 1

The system values of the properties of the shellac floss produced by the microwaved-thermospinner and supported by three different reference from literature.

| | | Standard limits | | |
|---|---|---|---|---|
| Property | Invention value | Sharma et al., 1983 | Anonymous, 2008 | Sharma, 2017 |
| Color index | 13.2 [1.09] | n.d.[1] | n.d. | 8 to 50 |
| Insolubility in hot alcohol, % | 1.1 [0.104] | n.d. | 0.75-3 | n.d. |
| Solubility in cold water, % | 0.38 [0.037] | n.d. | <0.5 | n.d. |

TABLE 1-continued

The system values of the properties of the shellac floss produced by the microwaved-thermospinner and supported by three different reference from literature.

| Property | Invention value | Standard limits Sharma et al., 1983 | Anonymous, 2008 | Sharma, 2017 |
|---|---|---|---|---|
| Volatile matter content, % | 1.92 [0.17] | n.d. | <2 | n.d. |
| Ash content, % | 0.286 [0.061] | n.d. | <0.3 | n.d. |
| Acid value, mg KOH/g | 68 [2.08] | n.d. | 65-75 | n.d. |
| Waxiness, % | 2.6 [0.12] | n.d. | 2.5-5.5% | 3-5 |
| Acid value, mg KOH/g | 76.04 [2.68] | 65-75 | 73-89 | n.d. |
| Flow of shellac molten, mm | 54.7 [1.73] | n.d. | n.d. | 35 to 55 |
| Heat of polymerization, min | 34.7 [1.16] | n.d. | n.d. | 30 to 50 |
| Specific gravity | 1.182 [0.314] | 1.14 to 1.21 | 1.14 to 1.21 | n.d. |
| Molecular weight, Daltons | 1002 [10] | 1006 | n.d. | 660 to 1000 |

[1]Not defined.

The methods of the present disclosure show several advantages as synergetic centrifugal and thermal effect 304 provides the pure shellac floss or fibers. One advantage is the shellac floss exhibit high purity and natural qualities associated with shellac. Another advantage of the pure shellac floss is high surface area to volume ratio. Yet another advantage is high solubility in ethanol or methanol. Other advantages of the pure shellac floss include high hydrophobicity, high resistivity to acids and high electric insulation properties compared to the crude shellac. Due to the high purity as well as high thermal stability, the purified shellac floss or paste or semi-liquid can be cast into various shapes for industrial applications. It is understood that the examples, embodiments and teachings presented in this application are described merely for illustrative purposes. Any variations or modifications thereof are to be included within the scope of the present application as discussed.

What is claimed is:

1. A system for manufacturing purified shellac floss from crude shellac, the system comprising:
    a spinner unit comprising a rotatable head with a cavity to accommodate the crude shellac;
    a microwave generator unit configured to supply microwave radiation to the spinner unit; and
    a collection unit comprising a side wall and an end wall defining an interior volume and configured to collect the purified shellac floss.
2. The system of claim 1, wherein the spinner unit further comprises:
    a motor;
    a coil support attached with the motor and configured to control vibrations during operation; and
    a first connector connecting the motor to the rotatable head.
3. The system of claim 1, wherein the microwave generator unit further comprises:
    a magnetron;
    a transformer configured to supply electric power to the magnetron; and
    a capacitor in communication with the magnetron and the transformer.
4. The system of claim 3, wherein the microwave generator unit further comprises:
    a rheostat configured to communicate with the transformer; and
    a second connector configured to communicate between the rheostat and an electric power source.
5. The system of claim 3, wherein the microwave generator unit further comprises:
    a waveguide arranged to direct the microwaves from the magnetron towards the spinner unit; and
    a fan configured to distribute air around the transformer and the magnetron.
6. The system of claim 1, wherein at least a portion of the side wall of the collection unit further comprises perforations.
7. The system of claim 1, wherein the collection unit is made of a metal or a plastic material.
8. The system of claim 7, wherein the collection unit is made of stainless steel.
9. The system of claim 1, wherein the spinner unit is configured to rotate at a speed between 2000 to 4000 rpm.
10. The system of claim 1, wherein the rotatable head of the spinner unit is hemispherical in shape.
11. A method of manufacturing purified shellac floss, the method comprising:
    micronizing crude shellac flakes;
    introducing the micronized flakes into a spinner unit;
    supplying microwave radiation to the spinner unit;
    melting the micronized shellac flakes with the microwave radiation at a predetermined temperature;
    centrifuging the melted micronized flakes at a predetermined speed to form purified shellac floss; and
    collecting the purified shellac floss in a collection unit.
12. The method of claim 11 further comprising, melting the micronized shellac flakes at a predetermined temperature between 60° C. to 85° C.
13. The method of claim 12, wherein the predetermined temperature is about 75° C.
14. The method of claim 11 further comprising, micronizing the crude shellac flakes having a shape selected from a group comprising rectangular, circular, square, oval, elliptical, triangular, polygonal, hexagonal, octagonal, acicular, or a combination thereof into needle-shaped shellac flakes.
15. The method of claim 14, wherein the crude shellac flakes are micronized to a size less than or equal to about 0.20-0.25 μm×3-5 cm.
16. The method of claim 15, wherein the crude shellac flakes are micronized to a size equal to about 0.25 μm×5 cm.
17. The method of claim 11 further comprising centrifuging the spinner unit at the predetermined speed between 2000 to 4000 rpm.
18. The method of claim 17, wherein the predetermined speed of the spinner unit is 2300 rpm.
19. The method of claim 17, wherein the predetermined speed of the spinner unit is 3600 rpm.
20. A method of using the purified shellac floss of claim 11 in preparation of products selected from a group comprising electronic goods, pharmaceuticals, drug delivery material, agricultural appliances, food products, building material, insulation material and membranes.

* * * * *